(12) United States Patent
Izquierdo

(10) Patent No.: US 6,192,032 B1
(45) Date of Patent: Feb. 20, 2001

(54) RATE ATTENUATION SYSTEMS, METHODS AND COMPUTER PROGRAM PRODUCTS FOR REDUCING LOW PRIORITY VIDEO FRAME PACKETS TRANSMITTED OVER A NETWORK

(75) Inventor: Michael R. Izquierdo, Cary, NC (US)

(73) Assignee: International Business Machines Corporation, Armonk, NY (US)

(*) Notice: Under 35 U.S.C. 154(b), the term of this patent shall be extended for 0 days.

(21) Appl. No.: 09/002,520

(22) Filed: Jan. 2, 1998

(51) Int. Cl.[7] .............................. H04L 12/26; H04L 12/56
(52) U.S. Cl. ............................................. 370/230; 370/412
(58) Field of Search .................................... 370/229, 230, 370/231, 232, 235, 236, 412

(56) References Cited

U.S. PATENT DOCUMENTS

| | | | |
|---|---|---|---|
| 5,159,447 | 10/1992 | Haskell et al. | 358/133 |
| 5,253,247 | * 10/1993 | Hirose et al. | 370/232 |
| 5,457,687 | 10/1995 | Newman | 370/85.3 |
| 5,485,211 | 1/1996 | Kuzma | 348/409 |
| 5,506,844 | 4/1996 | Rao | 370/84 |
| 5,537,446 | * 7/1996 | Lakshman et al. | 375/371 |
| 5,541,852 | * 7/1996 | Eyuboglu et al. | 709/232 |
| 5,784,358 | * 7/1998 | Smith et al. | 370/230 |
| 5,831,971 | * 11/1998 | Bonomi et al. | 370/230 |
| 5,844,890 | * 12/1998 | Delp et al. | 370/230 |
| 5,974,033 | * 10/1999 | Kamiya et al. | 370/323 |

FOREIGN PATENT DOCUMENTS 8-242258A 9/1996 (JP) ............................. H01L/12/56

OTHER PUBLICATIONS

IBM Technical Disclosure Bulletin, vol. 40, No. 01, Jan. 1997.

* cited by examiner

Primary Examiner—Melvin Marcelo
Assistant Examiner—Phuongchau Ba Nguyen
(74) Attorney, Agent, or Firm—Daniel E. McConnell

(57) ABSTRACT

A video frame transmitter for transmitting video frame packets into a communications network includes a traffic smoother for adjusting video frame packet transmission rates; a token bucket for controlling video frame packet entry into the network; and a transmission rate attenuator for adjusting video frame packet transmission rates. The traffic smoother adjusts transmission rates from a video frame source to meet a transmission delay bound of the frame source. Video frame packet transmission rates are attenuated to conform with the state of the token bucket in order to maintain a high percentage of high priority video frame packets entering the network. The rate attenuator allows the traffic smoother and token bucket to work together to reduce the number of low priority packets entering the network.

14 Claims, 7 Drawing Sheets

RATE ATTENUATION SYSTEMS, METHODS AND COMPUTER PROGRAM PRODUCTS FOR REDUCING LOW PRIORITY VIDEO FRAME PACKETS TRANSMITTED OVER A NETWORK

FIELD OF THE INVENTION

The present invention relates generally to video image processing and more particularly to the transmission of video images over networks.

BACKGROUND OF THE INVENTION

The bandwidth requirements of uncompressed digital video streams may exceed the available bandwidth of communication networks such as local area networks (LANs). For example, uncompressed video streams may require between 100 and 240 million bits per second (MBPS) for delivery without distortions or delays at the receiving end. As a result, various methods of compressing digital video streams have been developed to reduce bandwidth requirements to levels acceptable to most networks.

Digital video compression methods typically utilize a collection of algorithms and techniques for replacing the original pixel-related information with more compact mathematical descriptions. Decompression is the reverse process of decoding mathematical descriptions back to pixels for display. Video compression and decompression may be performed using a CODEC (Coder/Decoder or Compressor/Decompressor).

Digital video streams may be transmitted over networks at either a variable bit rate (VBR traffic) or a constant bit rate (CBR traffic). Digital video systems may use buffers to smooth out rate variations in compressed data streams. For example, U.S. Pat. No. 5,485,211 to Kuzma relates to introducing feedback between a video CODEC and a communications channel such that characteristics of the channel are used to drive multiple output buffers. The communications channel can select from the buffer that best matches the communications channel's current conditions.

Buffer control for CBR traffic is reasonably well understood. However, VBR has only recently become widely available and buffer control methods for VBR traffic are still developing. U.S. Pat. No. 5,159,447 to Haskell et al. relates to controlling the number of bits employed to encode each video frame and the transmission bit-rate of the VBR channel as experienced by the encoder.

The difficulty in transporting VBR traffic over communications networks is that VBR traffic is bursty (high peak-to-mean ratios), highly correlated and has strict delay bounds. VBR traffic sources can strain a network's resources and potentially degrade performance, causing excessive packet delays and loss. To manage this problem, traffic shaping mechanisms for shaping traffic before it enters the network have been proposed. Examples of such mechanisms include Traffic "Smoothers" and "Token Buckets."

A token bucket is a device placed at the entry point of a network. Tokens are generated at a fixed rate, σ, and flow into a bucket of a fixed size, β. Tokens arriving when the bucket is full are discarded. Each token represents a unit of data. Packets entering a network must acquire tokens equal to its data unit size (e.g. one token for each byte of data in the packet). If there are insufficient tokens, the packet is downgraded in priority, and sent into the network. The number of tokens in the bucket cannot be less than zero and no packets are dropped at the source.

Transport protocols which police incoming traffic deliver low priority packets on a best-effort basis. High priority packets are sent with guarantees on both delivery and delay. Low priority packets, however, can be dropped by the network if the network becomes congested. For video traffic, this can cause severe degradations in quality due to late or missing packets at the receiver.

Traffic smoothers have been proposed to reduce the burstiness of VBR video. A smoother chooses a transmission rate to minimize bit-rate variation, while conforming to a predetermined delay bound. A smoother guarantees that all frames from a video source will meet its transmission delay bound. A smoother may choose a rate which might cause packets to be downgraded in priority. As a result, a higher percentage of low priority packets may enter the network.

SUMMARY OF THE INVENTION

In view of the above discussion, it is an object of the present invention to allow a traffic smoother and token bucket to work together to reduce the number of low priority packets entering a network.

It is another object of the present invention to transmit VBR video data over congested computer networks without performance degradation and without causing excessive frame packet delays and loss.

These and other objects of the present invention are provided by methods, systems and computer program products for facilitating the transmission of video data over computer networks. A video frame transmitter for transmitting packets of each video frame into a network includes a traffic smoother for adjusting video frame packet transmission rates; a traffic policing device (e.g., a token bucket) for controlling video frame packet entry into the network; and a transmission rate attenuator for adjusting video frame packet transmission rates. The traffic smoother adjusts transmission rates from a video frame source to meet a transmission delay bound of the frame source. Video frame packet transmission rates are attenuated to conform with the state of the token bucket in order to maintain a high percentage of high priority video frame packets entering the network. The rate attenuator allows the traffic smoother and token bucket to work together, thereby reducing the number of low priority packets entering a network.

According to an aspect of the present invention, video frame packets containing tokens enter a network via the video frame transmitter and a rate attenuator predicts the future state of the token bucket. Utilizing the predicted state of the token bucket, the rate attenuator determines whether the token bucket has a sufficient number of tokens for each video packet within a video frame. In response to determining that a video frame packet does not have a sufficient number of tokens, the video frame packet transmission rate is reduced. Predictions of the future state of the token bucket may be based on: the current number of tokens in the token bucket; the size of the video frame packets currently in the traffic smoother buffer; the size of the current video frame; and the transmission rate of each frame.

A video frame which has just arrived may be referred to as the "current frame" and is the frame the transmission rate is calculated for. The state of the token bucket is predicted once to generate the number of tokens which will be in the token bucket when the current frame begins transmission. An iteration process starts with this number of tokens and then uses the current frame and transmission rate to calculate a token bucket state to see if any of these packets will be downgraded.

When a video frame packet transmission rate is reduced, the reduced rate is compared with a lower bound to determine whether the reduced video frame packet transmission rate is below this lower bound. The smoother determines the slowest transmission rate to transmit the current frame which will satisfy delay bound (D). This is the lower bound on the transmission rate. In response to determining that the reduced video frame packet transmission rate is below the lower bound, the video frame packet transmission rate is set to the lower bound. Video frame packet transmission rates are stored in a rate queue accessible by a scheduler.

According to another aspect of the present invention, the need for additional predictions of a future token bucket state can be reduced using an identified "pivot-point." A pivot-point is a point in time where token overflow within a token bucket occurs. Transmission rate reductions will not change the number of tokens in the token bucket at the pivot-point. By recalculating the number of tokens needed starting at the pivot-point, there is no need to recalculate starting from the first packet in the frame. When the transmission rate of the current frame is reduced, more tokens will be generated. As a result it is possible for the token bucket to overflow at this rate. If this happens, there will not be enough tokens (i.e., the process is "short" tokens) and packets will be downgraded. As a result, the token bucket state is recalculated starting with the first packet in the frame using the lower transmission rate to determine if there are still tokens short. If there are not any tokens short, then an overflow did not occur and the lower transmission rate is stored in the rate queue. If there are tokens short, rate attenuation is performed and the process is iterated. This iteration continues until either the lower bound is reached or there are no tokens short.

According to another aspect of the present invention, additional predictions of a future token bucket state can be avoided using a "minimum-distance." Minimum-distance is the smallest distance between token bucket size and a number of tokens in the bucket prior to a packet departure. If a deficiency of tokens in the token bucket is a smaller number than the minimum distance, then an overflow will not occur when transmission rate reduction occurs. Accordingly, the token bucket state does not have to be recalculated.

The present invention is advantageous because the rate attenuator allows a traffic smoother and token bucket to work together to reduce the number of low priority video frame packets produced. This results in an increase in high priority packet throughput and, in turn, better video quality. The present invention reduces the rate of low priority packet generation given the same token bucket parameters. The present invention also facilitates reducing the magnitude of token bucket size. A smaller bucket size increases the chances of obtaining a connection. Thus, using rate attenuation in accordance with the present invention, the number of connections will increase, thereby increasing statistical multiplexing gain.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
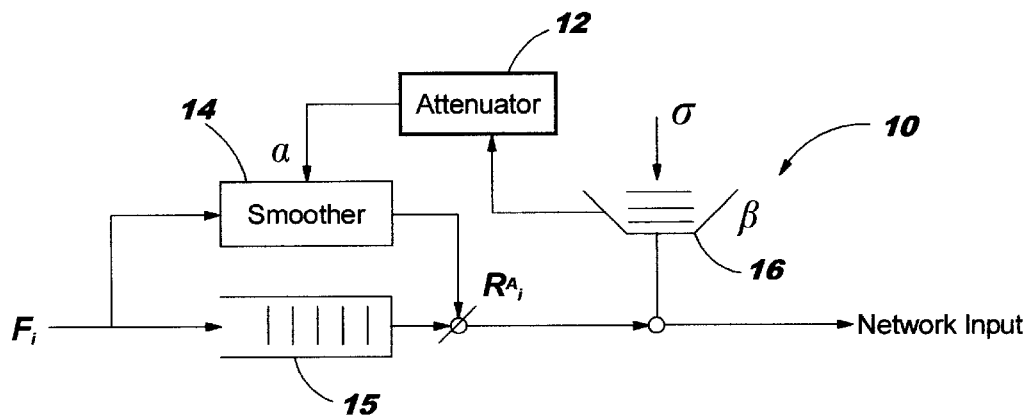
FIG. 1 schematically illustrates a VBR transmitter using a rate attenuator with a traffic smoother and token bucket.

Referring now to FIG. 1, a VBR video frame transmitter 10 using a rate attenuator 12 with a traffic smoother 14 and token bucket 16 according to aspects of the present invention is schematically illustrated. The rate attenuator 12 allows the traffic smoother 14, a traffic smoother buffer 15, and the token bucket 16 to work together, in order to reduce the number of low priority packets produced. This results in an increase in high priority packet throughput and, in turn, higher video quality. The attenuator 12, upon the arrival of a video frame, predicts the future state of the token bucket 16 based on the current number of tokens in the token bucket, the size of the packets currently in the traffic smoother buffer, and the size of the current video frame. From this, the rate attenuator 12 determines if any of the packets from the current frame will be short tokens, and calculates an attenuation factor to reduce the current frame's transmission rate.

Video systems display information as a sequence of still pictures referred to as frames. Each frame is transmitted through a network as a series of packets. In high-speed networks, a control system referred to as a "Token Bucket" control system may be necessary to control the entry rate of frame packets into a network to ensure that a receiving node of the packets does not exceed its allowance. In a token bucket control system, a packet entering a network passes through a gate called the token bucket. The token bucket acts as a counter which represents the number of bytes that may be transmitted immediately into the network. In order for a packet to pass through the token bucket and enter the network, the token bucket must have a non-zero value (i.e., packet size is less than or equal to the number of tokens). Token buckets have a defined maximum value of tokens that can enter a network. Token buckets allow short bursts of packets into a network while enforcing an average delivery rate over time. The counter is incremented at a fixed rate and does not exceed a maximum value. Any packet where packet size is greater than number of tokens is non-conforming.

A traffic smoother calculates the transmission rate of a video frame based on constraints such as maximum frame delay (referred to as "delay bound"). A traffic smoother calculates an upper and lower bound on the transmission rate using these constraints and chooses a transmission rate within these bounds. Typically, a moving average rate is used. An objective of a traffic smoother is to minimize transmission rate variation.

The present invention, via a rate attenuator and various embodiments thereof, provides mechanisms for a token bucket to operate in conjunction with a traffic smoother. Typically, a token bucket and traffic smoother operate independently causing packet priority downgrades. According to the present invention, by reducing the transmission rate of a video frame, a token bucket is allowed to generate more tokens so that all packets within the video frame are transmitted without any priority downgrades.

Operations of aspects of the present invention illustrated in FIG. 1 will now be described with respect to FIG. 2 which is a flowchart illustration of an embodiment of the present invention. A video frame arrives at the traffic smoother (Block 100). The smoother selects a transmission rate for the packets of the video frame (Block 110). A rate attenuator then predicts a future state of the token bucket based on four parameters: a) the current number of tokens in the token bucket; b) the size of the packets in the traffic smoother; c) the size of the current video frame; and d) the transmission rate of the current frame (Block 120). A determination is then made whether any frame packets have insufficient tokens in the token bucket (Block 130). If the answer is yes, the transmission rate of the current video frame packets is reduced (Block 140). If the answer is no, or after the transmission rate has been reduced in Block 140, a determination is made whether the transmission rate of the current video frame packets is below a lower bound (Block 150). If the transmission rate is below a lower bound, the transmission rate is set to the lower bound (Block 160) and stored within a rate queue (Block 170). If the transmission rate is not below a lower bound, a determination is made whether the transmission rate has been reduced (Block 162). If the transmission rate has been reduced, the token bucket state is recalculated using the lower transmission rate starting at the first packet of the current frame (Block 164). If the transmission rate has not been reduced, the transmission rate is stored within a rate queue (Block 170). A scheduler transmits the packets of each video frame into the network at the rate specified in the rate queue (Block 180).

Blocks 130 through 170 represent an iteration of operations performed for all packets of a video frame. The illustrated iteration of operations is performed for each video frame arriving at the traffic smoother. Scheduler operations are performed independently of operations represented by Block 100 through Block 170. The scheduler transmits frame packets based on rates stored within the rate queue and is idle when no rates are stored within the rate queue. As is understood by those skilled in the art, a scheduler determines when to transmit a packet into the network.

Figure 3:
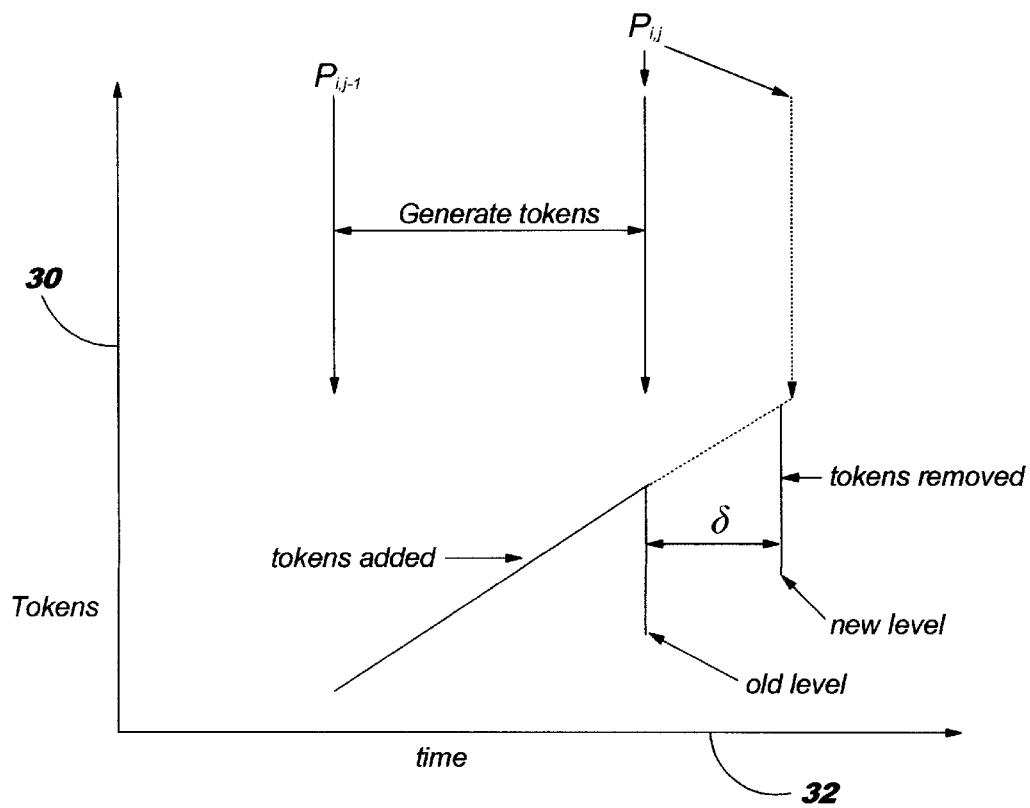
FIG. 3 schematically illustrates token bucket state between packet departures and the effect of attenuation.

Referring now to FIG. 3, the token bucket state between packet departures and the effect of attenuation is illustrated. The number of tokens is plotted along the "Y" axis and indicated as 30. Time is plotted along the "X" axis and indicated as 32. FIG. 3 illustrates that by delaying the departure of packet $P_{i,j}$ by $\delta$ seconds, where i is the corresponding frame and j is the jth packet of frame i, the number of tokens remaining after departure $P_{i,j}$ is increased. The rate attenuator 12 insures that the transmission rate will not be less than the lower bound calculated by the traffic smoother. The transmission rate of each video frame is determined at arrival time at the traffic smoother. Consequently, there is a delay between when the frame arrives at the traffic smoother 14 and when it arrives at the token bucket 16. This requires the rate attenuator 12 to predict the future state of the token bucket 16.

When a violation occurs due to insufficient tokens, the rate attenuator 12 calculates a new transmission rate $R_i^A = \alpha R_i$ where $R_i$ is the rate determined by the traffic smoother, and is the attenuation factor which satisfies the relation:

$$\frac{1}{1+R_i/\sigma} \le \alpha \le 1 \quad \text{(Equation 1)}$$

In order to calculate the attenuated rate, a determination is made for how long to extend the transmission of the current frame. The transmission time of a frame is $D_{tx}$, which is the interval between when the first bit of the first packet and the last bit of the last packet in frame i is transmitted. $D_{tx}$ is defined as follows:

$$D_{tx} = \frac{1}{R_i} \sum_{j=1}^{S} P_{i,j} \quad \text{(Equation 2)}$$

$P_{i,j}$ is the size of the jth packet of frame i, and $R_i$ is the bit-rate of frame i.

The expression $T'_{a,b}$ is the number of tokens in the token bucket 16 after a frame packet has departed, and is defined as follows:

$$T'_{a,b} = T_{a,b-1} + \left(\frac{\sigma}{R_a} - 1\right) P_{a,b} \quad \text{(Equation 3)}$$

where $a = i-L, i-L+1, \ldots i-1$
$b = 1, 2, \ldots S$ where $T_{a,b}$ is the number of tokens in the token bucket 16 after packet $P_{a,b}$ departs when token bucket constraints are applied, $T_{a,b}$ is defined as follows:

$$T_{a,b}=0 \ T'_{a,b} \le 0 \ T_{a,b}=T'_{a,b} \ 0 \le T'_{a,b} \le \beta \ T_{a,b}=\beta \ T'_{a,b} \ge \beta \quad \text{(Equation 4)}$$

The number of tokens short $T_{short}$ is defined as follows:

$$T_{short}=P_{a,b}-T_{a,b} \ a=i \ b=1,2\ldots S \quad \text{(Equation 5)}$$

To generate more tokens and, thereby, avoid a traffic policing violation, the transmission time is extended by $\delta$ seconds where:

$$\delta = \frac{T_{short}}{\sigma} \quad \text{(Equation 6)}$$

The new transmission time, defined as the time when the first bit of frame i begins transmitting until the last bit departs, is determined as follows:

$$D_i^A = D_{tx} + \delta \quad \text{(Equation 7)}$$

Substituting equations (2) and (6) into equation (7) results in the following:

$$D_{tx}^A = \frac{1}{R_i} \sum_{j=1}^{L} P_{i,j} + \frac{T_{short}}{\sigma} \quad \text{(Equation 8)}$$

where $1 \leq L \leq S$

The following is also true:

$$D_{tx}^A = \frac{1}{\alpha R_i} = \sum_{j=1}^{L} P_{i,j} \quad \text{(Equation 9)}$$

where $1 \leq L \leq S$

Thus, combining equations (8) and (9), results in the following:

$$\alpha = \left(1 + \frac{R_i T_{short}}{\sigma \sum_{j=1}^{L} P_{i,j}}\right)^{-1} \quad \text{(Equation 10)}$$

Thus, $\alpha$ approaches 1 as $T_{short}$ approaches 0 and $\alpha$ approaches the quantity $(1/(1+R_i/\sigma))$ as $T_{short}$ approaches $$\sum_{j=1}^{S} P_{i,j}$$

Once $\alpha$ is determined, the token bucket state needs to be recalculated for the current frame at the new attenuated rate. This is necessary since it is possible for the token bucket to overflow at the new rate. If this occurs, then packets for the current frame will still be short tokens when they reach the token bucket. To avoid this, the transmission rate is attenuated further until it reaches the lower bound. This process continues until there are no longer any tokens short for all packets within the current frame.

Figure 4:
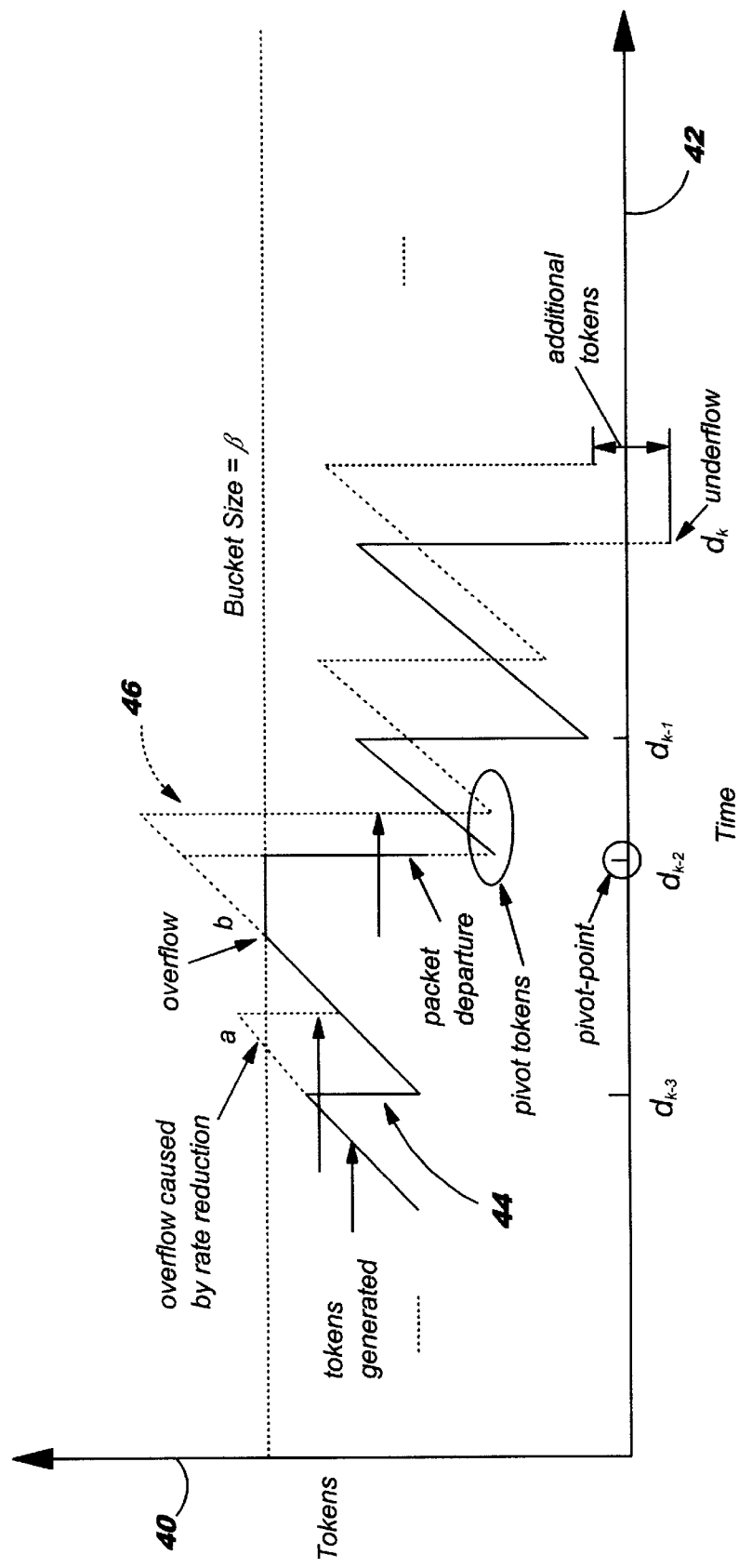
FIG. 4 schematically illustrates the effect of increasing bit-rate on token bucket state at pivot-point $d_{k-2}$.
Figure 5:
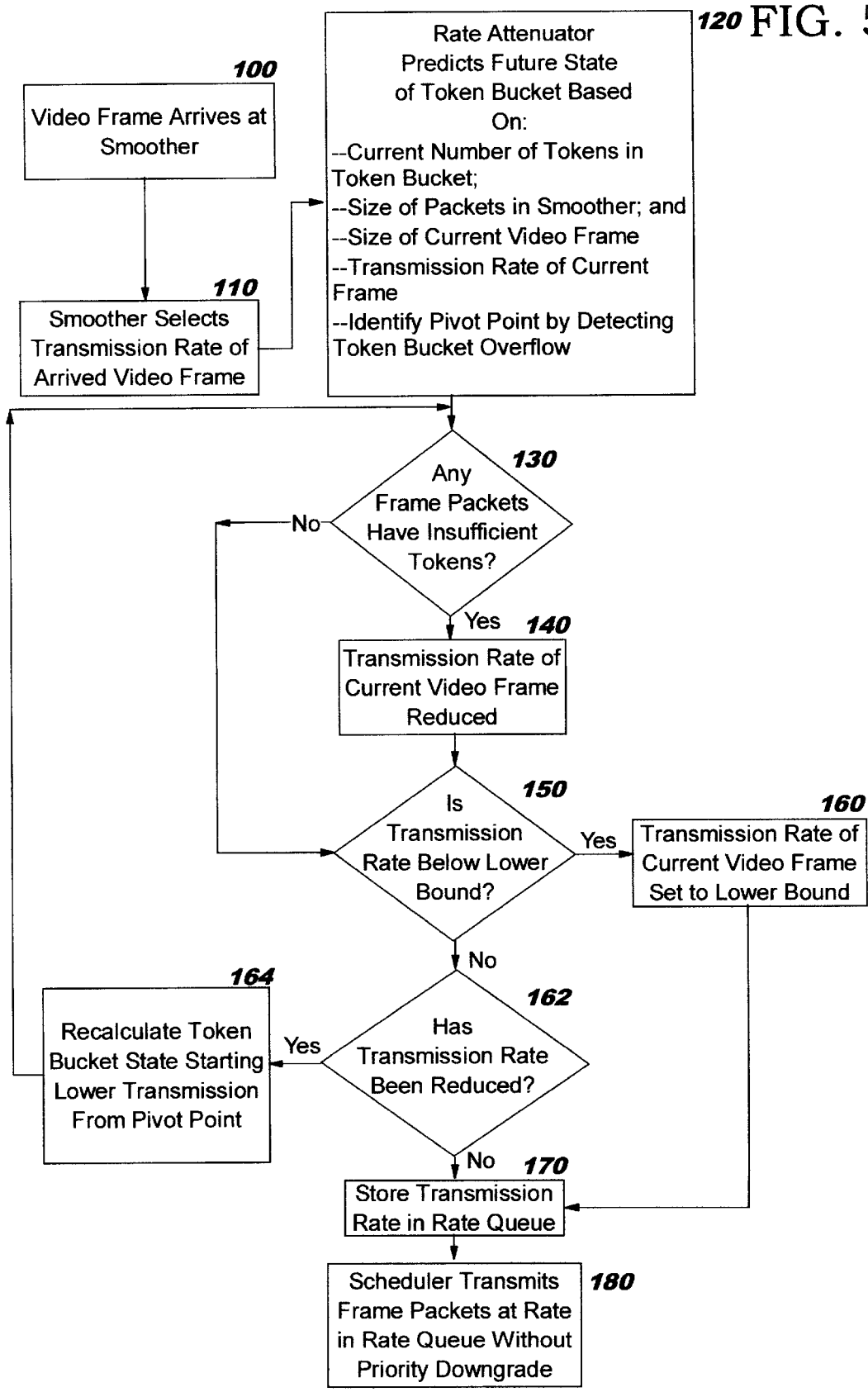
FIG. 5 is a flowchart illustrating operations of a rate attenuator wherein a pivot-point is identified, according to aspects of the present invention.

Referring now to FIGS. 4 and 5, the number of iterations (operations indicated by Block 130 through Block 170 of FIG. 2) can be reduced utilizing "pivot-points" according to another aspect of the present invention. A pivot-point is defined as the point where a token bucket overflow is detected. Any reduction in packet transmission rate will not change the number of tokens in the bucket at the pivot-point.

Referring now to FIG. 4, token bucket state between packet departures and the effect of attenuation utilizing the pivot-point aspect of the present invention, is illustrated. The number of tokens is plotted along the "Y" axis and indicated as 40. Time is plotted along the "X" axis and indicated as 42. The token bucket state is represented by a "saw-tooth" wave 44. As packets pass through the token bucket, the number of tokens equaling the number of bytes in the packet is removed from the token bucket. Prior to transmission rate reduction, the token bucket overflows at point b. Reducing the transmission rate pushes the saw-tooth wave out to the right (indicated by the dashed line 46), thereby causing an additional overflow at point a. This occurrence, however, does not change the number of tokens at the pivot-point $d_{k-2}$. Therefore, the number of tokens needed, starting from the pivot-point $d_{k-2}$, can be recalculated and starting from the first packet in frame i can be avoided.

Referring now to FIG. 5, operations utilizing the pivot-point illustrated in FIG. 4 are illustrated. A video frame arrives at the traffic smoother (Block 100). The smoother selects a transmission rate for the packets of the video frame (Block 110). A rate attenuator then predicts a future state of the token bucket based on four parameters: a) the current number of tokens in the token bucket; b) the size of the packets in the traffic smoother; c) the size of the current video frame; and d) the transmission rate of the current frame (Block 120). In addition to predicting token bucket state, the rate attenuator also identifies a pivot-point by detecting token bucket overflow (Block 120). A determination is then made whether any frame packets have insufficient tokens in the token bucket (Block 130). If the answer is yes, the transmission rate of the current video frame packets is reduced (Block 140).

A determination is then made whether the transmission rate of the current video frame packets is below a lower bound (Block 150). If the answer is yes, the transmission rate is set to the lower bound (Block 160) and stored within a rate queue (Block 170). If the transmission rate is not below the lower bound, a determination is made whether the transmission rate has been reduced (Block 162). If the transmission rate has been reduced, token bucket state is recalculated starting at the pivot-point (Block 164) and the iteration continues at Block 130. Accordingly, the average performance of the rate attenuator is improved by reducing the number of iterations performed. If the transmission rate has not been reduced, the transmission rate is stored within a rate queue (Block 170). A scheduler transmits the packets of each video frame into the network at the rate specified in the rate queue (Block 180).

Figure 6:
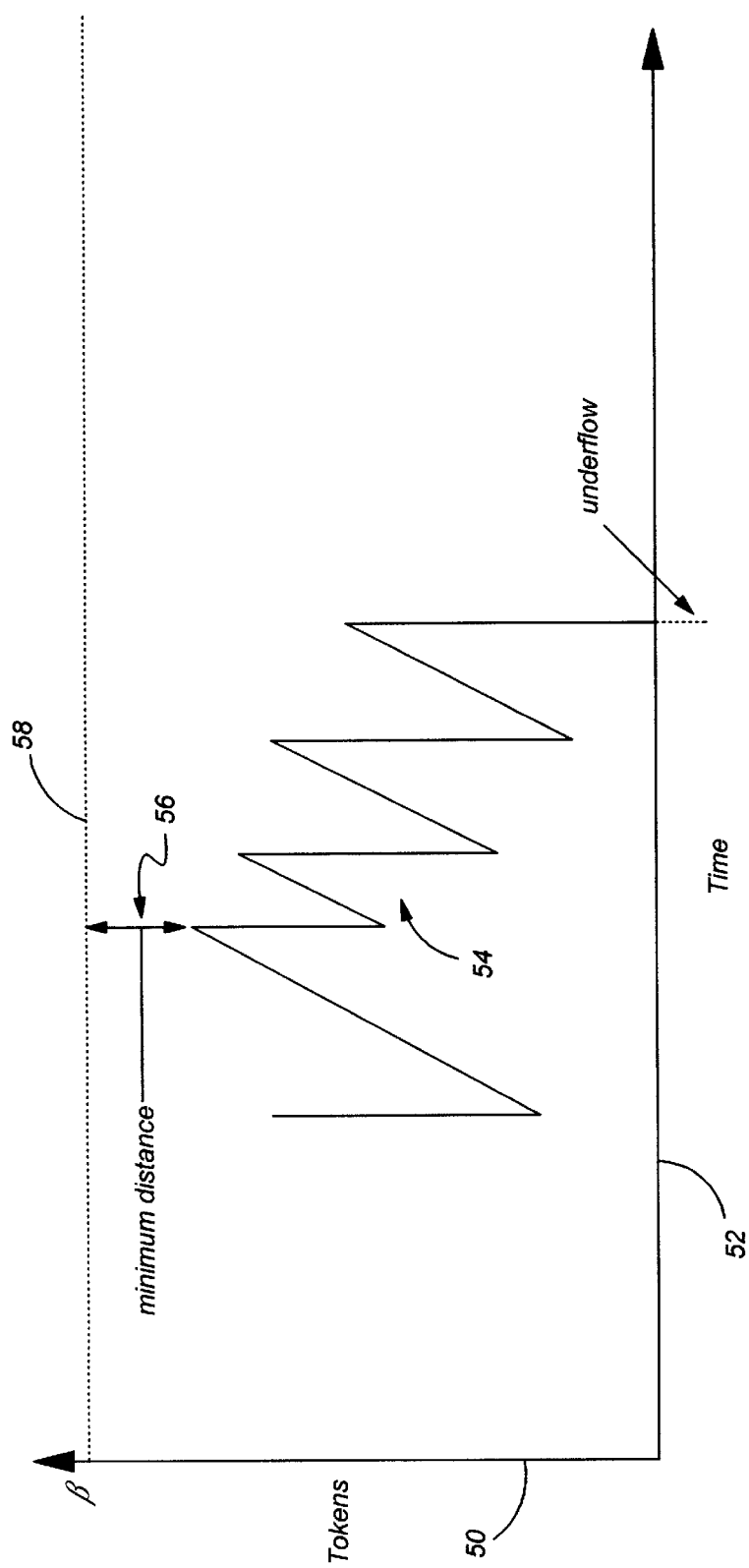
FIG. 6 schematically illustrates minimum-distance, according to aspects of the present invention.
Figure 7:
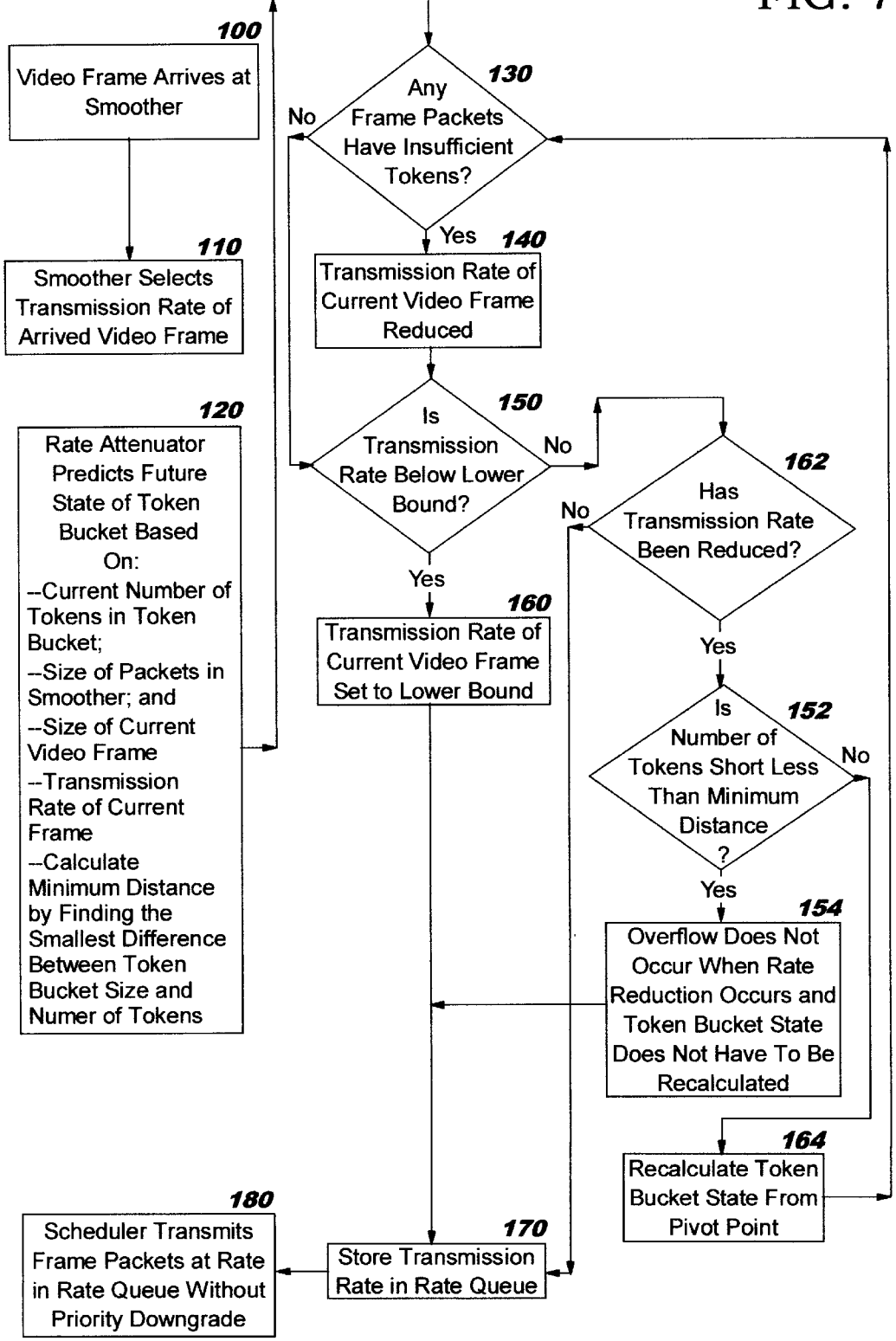
FIG. 7 is a flowchart illustrating operations of a rate attenuator wherein a minimum-distance is calculated, according to aspects of the present invention.

Referring now to FIGS. 6 and 7, whether iterations (operations indicated by Block 130 through Block 170 of FIG. 2) are required at all can be determined utilizing "minimum-distances" according to another aspect of the present invention. Referring to FIG. 6, "minimum-distance" is schematically illustrated. The number of tokens is plotted along the "Y" axis and indicated as 50. Time is plotted along the "X" axis and indicated as 52. The token bucket state is represented by a "saw-tooth" wave 54. Minimum-distance 56 is calculated by finding the smallest difference between the token bucket size $\beta$ (indicated by dotted line 58) and the number of tokens in the bucket at the departure time of packets in the current frame. If the number of tokens short is less than the minimum-distance 56, then an overflow will not occur when transmission rate reduction occurs and the token bucket state does not have to be recalculated. Accordingly, iteration operations (Block 130 through Block 170 of FIG. 2) are unnecessary and the average performance of the rate attenuator is improved.

Referring now to FIG. 7, operations involved in utilizing minimum-distance according to the present invention are illustrated. A video frame arrives at the traffic smoother (Block 100). The smoother selects a transmission rate for the packets of the video frame (Block 110). A rate attenuator then predicts a future state of the token bucket based on four parameters: a) the current number of tokens in the token bucket; b) the size of the packets in the traffic smoother; c) the size of the current video frame; and d) the transmission rate of the current frame (Block 120). In addition to predicting token bucket state, the rate attenuator also calculates a minimum-distance by finding the smallest difference between token bucket size and the number of tokens in the token bucket prior to a packet departure (Block 120).

A determination is then made whether any frame packets have insufficient tokens in the token bucket (Block 130). If the answer is yes, the transmission rate of the current video frame packet is reduced (Block 140). If no frame packets have insufficient tokens, or after the transmission rate has been reduced in Block 140, a determination is made whether the transmission rate of the current video frame packets is below a lower bound (Block 150). If the transmission rate is below a lower bound, the transmission rate is set to the lower bound (Block 160) and stored within a rate queue (Block 170).

If the transmission rate is not below the lower bound, a determination is made whether the transmission rate has been reduced (Block 162). If the answer is yes, a determination is then made whether the number of tokens short is less than the minimum distance (Block 152). If the answer is yes, overflow does not occur when transmission rate reduction occurs and token bucket state does not have to be recalculated (Block 154) and the transmission rate is stored within the rate queue (Block 170). If the number of tokens short is not less than the minimum distance (Block 152), the token bucket state is recalculated from the pivot-point (Block 164) and the iteration continues at Block 130. If it is determined that the transmission rate has not been reduced (Block 162), the transmission rate is stored within the rate queue (Block 170). A scheduler transmits the packets of each video frame into the network at the rate specified in the rate queue (Block 180).

Figure 2:
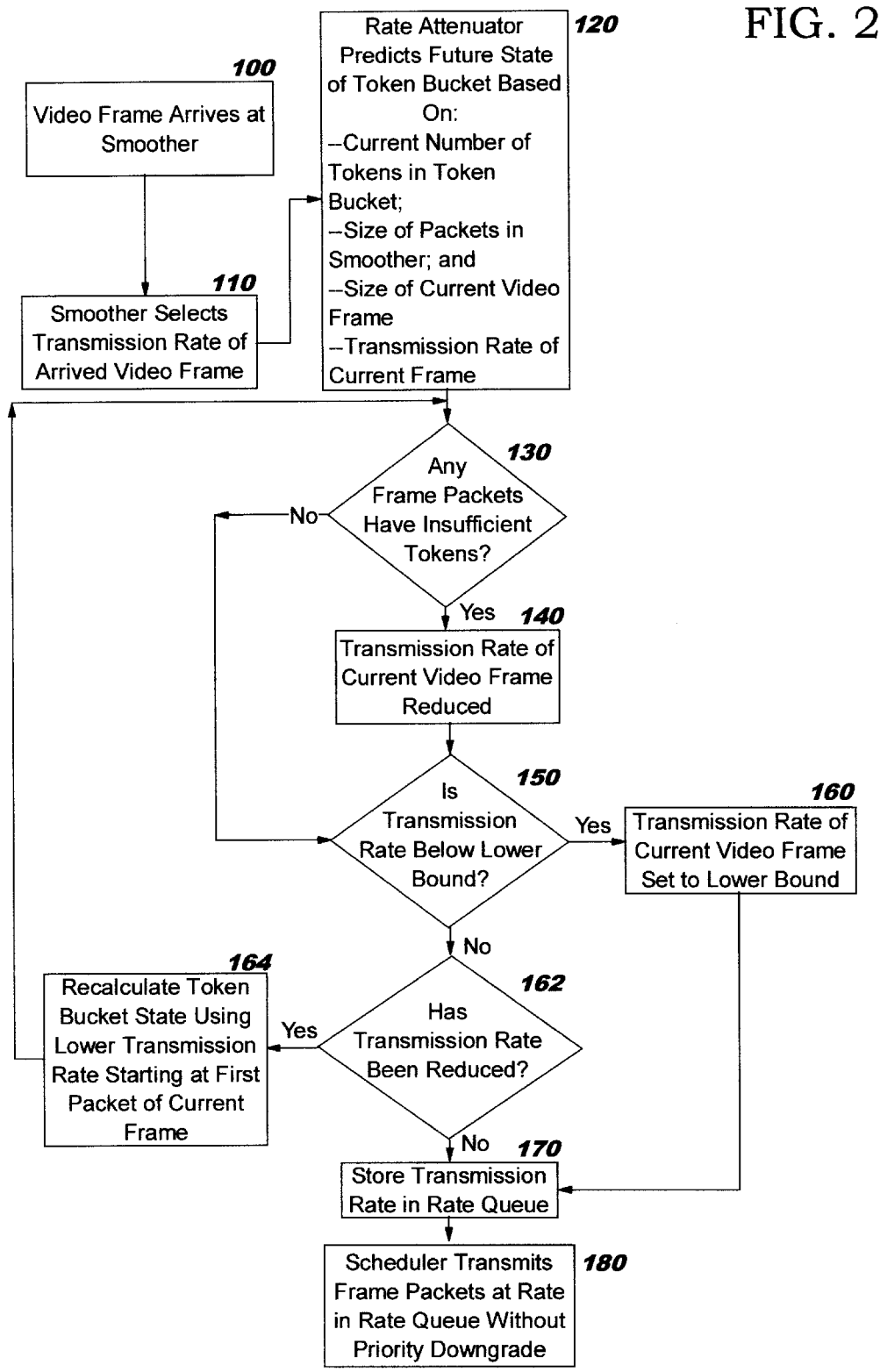
FIG. 2 is a flowchart illustrating operations of a rate attenuator, according to aspects of the present invention.

It will be understood that each block of the flowchart illustrations of FIGS. 2, 5 and 7, and combinations of blocks in the flowchart illustrations of FIGS. 2, 5 and 7, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 8:
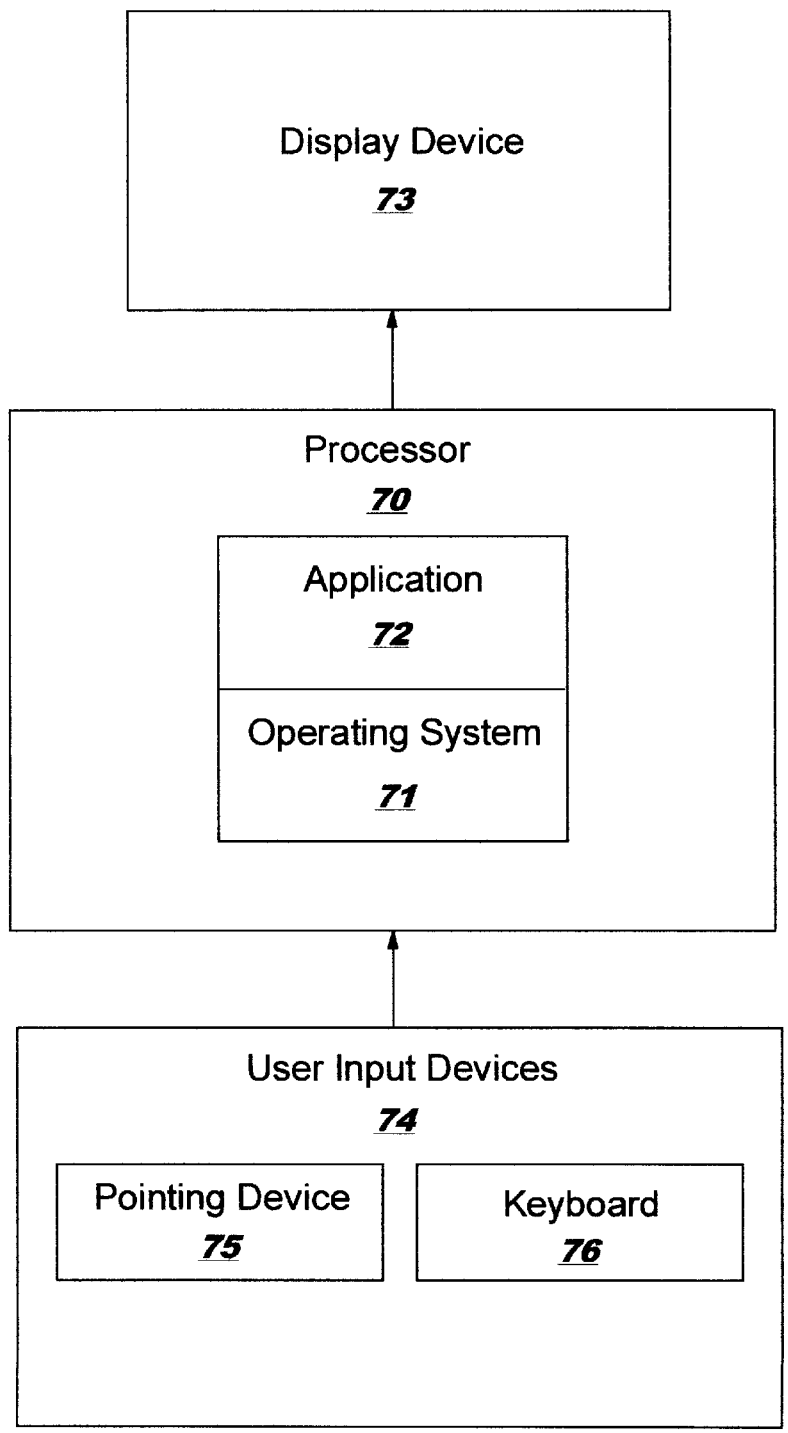
FIG. 8 illustrates an exemplary data processing system in which the present invention may be implemented.

Referring now to FIG. 8, an exemplary data processing system in which the present invention may be implemented is illustrated. As seen in FIG. 8, a data processor 70 may have an operating system 71 resident therein. An application program 72 typically executes via the operating system 71. The processor 70 displays information on a display device 73 which has a plurality of picture elements (collectively referred to as a screen). Typically, the information is displayed on the display device 73 within a user interface environment. The contents of the screen of the display device 73 and, therefore, the appearance of the user interface environment, may be controlled or altered by the application program 72 or the operating system 71 either individually or in combination. For obtaining input from a user, the operating system 71, the application program 72, or both, may utilize user input devices 74. User input devices 74 may include a pointing device 75, such as a mouse, and a keyboard 76 or other input devices known to those of skill in the art. User input devices 74 may be used to designate areas of the screen or locations on the screen such as the border of a workspace or the corner of the borders of the workspace.

Referring to Table 1 below and, as would be understood by those skilled in the art, a rate attenuator used in accordance with the present invention may be a part of the session layer code executing within a data processing system. Typically, the session layer code resides above the transport layer.

TABLE 1

Application
Presentation
Session
Transport
Network
Data Link
Physical

EXAMPLE

A discrete event simulator was developed using a C++ standard template library (STL). To drive the simulations, VBR video trace files were obtained from the University of Wuerzburg FTP (file transfer protocol) site (ftp-info3.informatik.uni-wuerzburg.de) in the directory/pub/MPEG. Each video was encoded using the parameters listed below in Table 2. The video sequences were originally recorded and encoded from VHS tapes. The length of each sequence is 40,000 frames, which represents about 30 minutes of play time at 24 frames per second.

TABLE 2

| Parameter | Setting |
| --- | --- |
| Encoder Input | 384x288 pel |
| Color Format | YUV (4:1:1, resolution) |
| Quantization Values | I = 10, P = 14, B = 18 |
| Pattern | IBBPBBPBBPBB |
| GOP Size | 12 |
| Motion Vector Search | Logarithmic/Simple |
| Reference Frame | Original |
| Slices | 1 (Used 15 slices per frame) |
| Vector/Range | Half pel/10 |

A longer version of the movie "Star Wars", consisting of 123,604 frames, was also used. The video trace was generated from an encoding of a laser disc recording. The size of each frame is 640×480 pixels at a frame rate of 24 frames per second. The Berkeley MPEG encoder (version 1.1) was used with group-of-pictures (GOP) parameters, M=3 and N=9, with each frame consisting of 15 slices.

As shown in Table 3, the 20 Wuerzburg traces were grouped into 4 categories based on content: movies, sports, news/talk, and others. One video from each category was selected as follows: "Dino", "News 1", "Super Bowl", and "Simpsons". This allowed the testing of the attenuator for video sequences containing different content and scene change behavior.

TABLE 3

| Video Sequence Name | Description |
| --- | --- |
| Dino | Movie "Jurassic Park" |
| News 1 | German TV news |
| SBowl | Super Bowl final 1995: San Diego vs. San Francisco |
| Simpsons | episode from "The Simpsons," Cartoon |
| Star Wars | Movie "Star Wars" (long version 123,604 frames) |

Each frame was segmented into packets, where each packet consists of an MPEG slice. Since the trace file consisted of only the number of bits per frame, the bits in each frame were divided equally over each slice. The metric packet Low Priority Rate (LPR) was used and is calculated as follows:

$$LPR = \frac{\text{Total Low Priority Packets Sent}}{\text{Total Packets Sent}}$$

Referring now to Table 4, the comparison of LPR produced without smoothing, with smoothing and with attenuation is illustrated. In each case, the token generation rate was fixed while the token bucket size was varied. As illustrated, when no smoothing was used, the LPR increased dramatically when the token bucket size was decreased beyond a certain point. For example, in News 1, the LPR increased from $10^{-4}$ to $10^{-1}$ when the token bucket size was decreased from 20,000 to 10,000 tokens.

TABLE 4

| Video Sequence | Token Bucket Size ($\times 10^3$) | No Smoothing | Smoothing | Attenuation |
|---|---|---|---|---|
| Dino $\sigma = 1.12 \times 10^5$ D = 125 msec | 10 | $3.917 \times 1 \times 10^{-4}$ | $8.833 \times 10^{-5}$ | $5.167 \times 10^{-5}$ |
| | 20 | $7.167 \times 10^{-5}$ | $3.167 \times 10^{-5}$ | $1.833 \times 10^{-5}$ |
| | 25 | $4.5 \times 10^{-5}$ | $1.0 \times 10^{-5}$ | 0 |
| | 27 | $4 \times 10^{-5}$ | $1.667 \times 10^{-6}$ | 0 |
| | 30 | $2.833 \times 10^{-5}$ | 0 | 0 |
| News 1 $\sigma = 2 \times 10^5$ D = 125 msec | 10 | $1.204 \times 10^{-1}$ | $8.833 \times 10^{-5}$ | $6.167 \times 10^{-5}$ |
| | 20 | $2.517 \times 10^{-4}$ | $4 \times 10^{-5}$ | $3.5 \times 10^{-5}$ |
| | 30 | $4.667 \times 10^{-4}$ | $1.667 \times 10^{-5}$ | $1.333 \times 10^{-5}$ |
| | 35 | $3.667 \times 10^{-5}$ | $6.667 \times 10^{-6}$ | $1.667 \times 10^{-6}$ |
| | 40 | $2.333 \times 10^{-5}$ | 0 | 0 |
| SBowl $\sigma = 2 \times 10^5$ D = 250 msec | 12 | $1.052 \times 10^{-3}$ | $3.5 \times 10^{-5}$ | $1.167 \times 10^{-5}$ |
| | 14 | $2.083 \times 10^{-4}$ | $1.667 \times 10^{-5}$ | $6.667 \times 10^{-6}$ |
| | 16 | $7.667 \times 10^{-5}$ | $1 \times 10^{-5}$ | $1.667 \times 10^{-6}$ |
| | 18 | $3.833 \times 10^{-5}$ | $5 \times 10^{-6}$ | 0 |
| | 20 | $2.5 \times 10^{-5}$ | 0 | 0 |
| Simpsons $\sigma = 1.6 \times 10^5$ D = 250 msec | 10 | $5.95 \times 10^{-3}$ | $3.667 \times 10^{-4}$ | $2.267 \times 10^{-4}$ |
| | 20 | $2.533 \times 10^{-4}$ | $1.733 \times 10^{-4}$ | $9.667 \times 10^{-5}$ |
| | 30 | $1.117 \times 10^{-4}$ | $7.833 \times 10^{-5}$ | $2.5 \times 10^{-5}$ |
| | 40 | $3.333 \times 10^{-5}$ | $1.5 \times 10^{-5}$ | $1.667 \times 10^{-6}$ |
| | 50 | $3.333 \times 10^{-6}$ | 0 | 0 |
| Star Wars (long version) $\sigma = 4.5 \times 10^5$ D = 250 msec | 10 | $1.161 \times 10^{-1}$ | $1.079 \times 10^{-6}$ | $1.079 \times 10^{-6}$ |
| | 12 | $8.340 \times 10^{-2}$ | $1.618 \times 10^{-6}$ | $5.394 \times 10^{-7}$ |
| | 14 | $5.876 \times 10^{-2}$ | $5.394 \times 10^{-7}$ | $5.394 \times 10^{-7}$ |
| | 16 | $4.131 \times 10^{-2}$ | $5.394 \times 10^{-7}$ | 0 |
| | 18 | $2.889 \times 10^{-2}$ | 0 | 0 |

The results using rate attenuation show significantly lower operating points, defined as when (LPR=0), for three of the video sequences: Dino, News 1, and SBowl. This implies that a user could transmit the Dino video with a token bucket size of 25,000 tokens using attenuation as opposed to 30,000 tokens without attenuation. For all sequences, using rate attenuation significantly reduced LPR given the same token bucket size. Conversely, given the same LPR, the token bucket size is smaller which is an important parameter in connection admittance algorithms.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of transmitting video frame packets into a network, said method comprising the steps of:

predicting a future state of a token bucket by responding to arrival of a video frame packet and generating the number of tokens which will be in the bucket when the current frame begins transmission;

utilizing the predicted state of the token bucket to determine whether a video frame packet within the token bucket has a sufficient number of tokens; and reducing a video frame packet transmission rate for the video frame packet if the video frame packet does not have a sufficient number of tokens.

2. A method according to claim 1 wherein said step of predicting a future state of a token bucket comprises:

determining a number of tokens in the token bucket;

determining sizes of future video frame packets; and determining a current video frame size.

3. A method according to claim 1 further comprising the steps of:

determining whether the reduced video frame packet transmission rate is below a lower bound; and setting video frame packet transmission rate to the lower bound if the reduced video frame packet transmission rate is below a lower bound.

4. A method according to claim 3 further comprising the step of storing the video frame packet transmission rate in a rate queue.

5. A method according to claim 1 further comprising the step of storing the reduced video frame packet transmission rate in a rate queue.

6. A method according to claim 1 further comprising the steps of:

identifying a pivot-point associated with the token bucket, wherein the pivot-point is a point in time where token bucket token overflow occurs; and determining a number of tokens required by the token bucket beginning at the pivot-point.

7. A method according to claim 1 further comprising the steps of:

determining the smallest distance between token bucket size and a number of tokens in a video frame packet so as to provide a minimum-distance; and determining if a deficiency of tokens in the token bucket is a smaller number than the minimum-distance.

8. Apparatus which transmits video frame packets into a network comprising:

a video frame transmitter having a traffic smoother which adjusts video frame packet transmission rates;

a token bucket which controls video frame packet entry into the network; and a rate attenuator operatively coupled to said transmitter and said bucket and which (a) predicts a future state of the token bucket by responding to arrival of a video frame packet and generating the number of tokens which will be in the bucket when the current frame begins transmission, (b) uses the predicted future state of the token bucket to determine whether a video frame packet within the token bucket has a sufficient number of tokens; and (c) responds to a determination that a video frame packet does not have a sufficient number of tokens by reducing video frame packet transmission rate.

9. Apparatus according to claim 8 wherein said rate attenuator determines (a) a number of tokens in the token bucket; (b) the sizes of video frame packets in the traffic smoother; and (c) a current video frame size.

10. Apparatus according to claim 8 wherein said traffic smoother (a) determines whether the reduced video frame packet transmission rate is below a lower bound; and (b) responds to a determination that the reduced video frame packet transmission rate is below a lower bound by setting the video frame packet transmission rate to the lower bound.

11. Apparatus according to claim 8 further comprising a rate queue in which is stored the reduced video frame packet transmission rate.

12. Apparatus according to claim 8 wherein said rate attenuator determines any need for successive predictions of future token bucket state.

13. Apparatus according to claim 12 wherein said rate attenuator (a) identifies a pivot-point, wherein the pivot-point is a point in time where token bucket token overflow occurs; and in response to identifying the pivot-point, (b) determines a number of tokens required by the token bucket beginning at the pivot-point.

14. Apparatus according to claim 12 wherein said rate attenuator determines (a) a minimum-distance, wherein the minimum-distance is the smallest distance between token bucket size and a number of tokens in a video frame packet; and responsive to determining the minimum distance, (b) if a deficiency of tokens in the token bucket is a smaller number than the minimum distance.

* * * * *